(12) United States Patent
Cook

(10) Patent No.: US 10,919,227 B2
(45) Date of Patent: Feb. 16, 2021

(54) MANUFACTURING SYSTEM FOR USE IN SPACE

(71) Applicant: BAE Systems plc, London (GB)

(72) Inventor: Austin James Cook, Balderstone (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/965,033

(22) PCT Filed: Feb. 19, 2019

(86) PCT No.: PCT/GB2019/050433
§ 371 (c)(1),
(2) Date: Jul. 27, 2020

(87) PCT Pub. No.: WO2019/162654
PCT Pub. Date: Aug. 29, 2019

(65) Prior Publication Data
US 2020/0406551 A1   Dec. 31, 2020

(30) Foreign Application Priority Data

Feb. 20, 2018  (EP) ...................................... 18157631
Feb. 20, 2018  (GB) ...................................... 1802704

(51) Int. Cl.
*B29C 64/357* (2017.01)
*B29C 64/245* (2017.01)
(Continued)

(52) U.S. Cl.
CPC .......... *B29C 64/357* (2017.08); *B23K 26/342* (2015.10); *B23K 26/38* (2013.01);
(Continued)

(58) Field of Classification Search
CPC ..... B29C 64/393; B29C 64/106; B29C 64/35; B29C 64/209; B29C 2945/76013;
(Continued)

(56) References Cited

U.S. PATENT DOCUMENTS 9,902,115 B1 * 2/2018 Janson ................. B29C 64/357
2012/0292449 A1   11/2012 Levin et al.
(Continued)

FOREIGN PATENT DOCUMENTS

CN   104228025 A   12/2014
CN   106541142 A   3/2017
(Continued)

OTHER PUBLICATIONS

Gaget, Lucie "3D Printing in Space: The Next Revolution?", Sculpteo.com, Nov. 29, 2017, 9 Pages.
(Continued)

*Primary Examiner* — Nahida Sultana
(74) *Attorney, Agent, or Firm* — Maine Cernota & Rardin

(57) ABSTRACT

A system comprising: an additive manufacturing apparatus configured to perform an additive manufacturing process using a feedstock supplied thereto, thereby to produce an article; a feedstock storage module configured to supply feedstock to the additive manufacturing apparatus; a machining apparatus configured to perform a machining process; a controller configured to control operation of the additive manufacturing apparatus and the machining apparatus; and are cycling module configured to receive a waste material and to produce the feedstock therefrom, and to transfer the produced feedstock to the feedstock storage module. The additive manufacturing apparatus and the machining apparatus comprise a common heat source, the additive manufacturing apparatus configured to use the common heat source to perform the additive manufacturing process, and the machining apparatus configured to use the common heat source to perform the machining process.

20 Claims, 2 Drawing Sheets

(51) Int. Cl.
  *B33Y 40/20* (2020.01)
  *B33Y 50/02* (2015.01)
  *B29C 64/118* (2017.01)
  *B29C 64/25* (2017.01)
  *B29C 64/393* (2017.01)
  *B33Y 70/00* (2020.01)
  *B64G 1/22* (2006.01)
  *B23K 26/342* (2014.01)
  *B23K 26/38* (2014.01)
  *B23Q 1/64* (2006.01)
  *B33Y 30/00* (2015.01)
  *B29K 69/00* (2006.01)
  *B29K 79/00* (2006.01)

(52) U.S. Cl.
  CPC ............. *B23Q 1/64* (2013.01); *B29C 64/118* (2017.08); *B29C 64/245* (2017.08); *B29C 64/25* (2017.08); *B29C 64/393* (2017.08); *B33Y 30/00* (2014.12); *B33Y 40/20* (2020.01); *B33Y 50/02* (2014.12); *B33Y 70/00* (2014.12); *B64G 1/22* (2013.01); *B29K 2069/00* (2013.01); *B29K 2079/085* (2013.01)

(58) Field of Classification Search
  CPC .. B29C 2945/76006; B29C 2945/7602; B33Y 50/02
  See application file for complete search history.

(56) References Cited

U.S. PATENT DOCUMENTS

| | | | |
|---|---|---|---|
| 2015/0209978 | A1 | 7/2015 | Snyder et al. |
| 2016/0082652 | A1 | 3/2016 | Snyder |
| 2016/0333486 | A1 | 11/2016 | Snyder et al. |
| 2017/0036783 | A1 | 2/2017 | Snyder |
| 2017/0282457 | A1* | 10/2017 | Burns .................... B33Y 10/00 |

FOREIGN PATENT DOCUMENTS

| | | |
|---|---|---|
| CN | 106825567 A | 6/2017 |
| EP | 2902137 A1 | 8/2015 |
| EP | 3147106 A1 | 3/2017 |
| WO | 2015189600 A2 | 12/2015 |
| WO | 2016043900 A1 | 3/2016 |

OTHER PUBLICATIONS

Search Report for European Appl. No. 18157631.5, dated Sep. 7, 2018, 10 Pages.
Search Report for Great Britian Appl. No. 1802704.5, dated Aug. 14, 2018, 4 Pages.
Combined Search and Examination Report for Great Britain Appl. No. 1902241.7, dated Aug. 9, 2019, 9 Pages.
International Search Report and Written Opinion for PCT Appl. No. PCT/GB2019/050433, dated Jun. 3, 2019, 13 Pages.
International Preliminary Report on Patentability for PCT Appl. No. PCT/GB2019/050433, dated Aug. 27, 2020, 7 Pages.

* cited by examiner

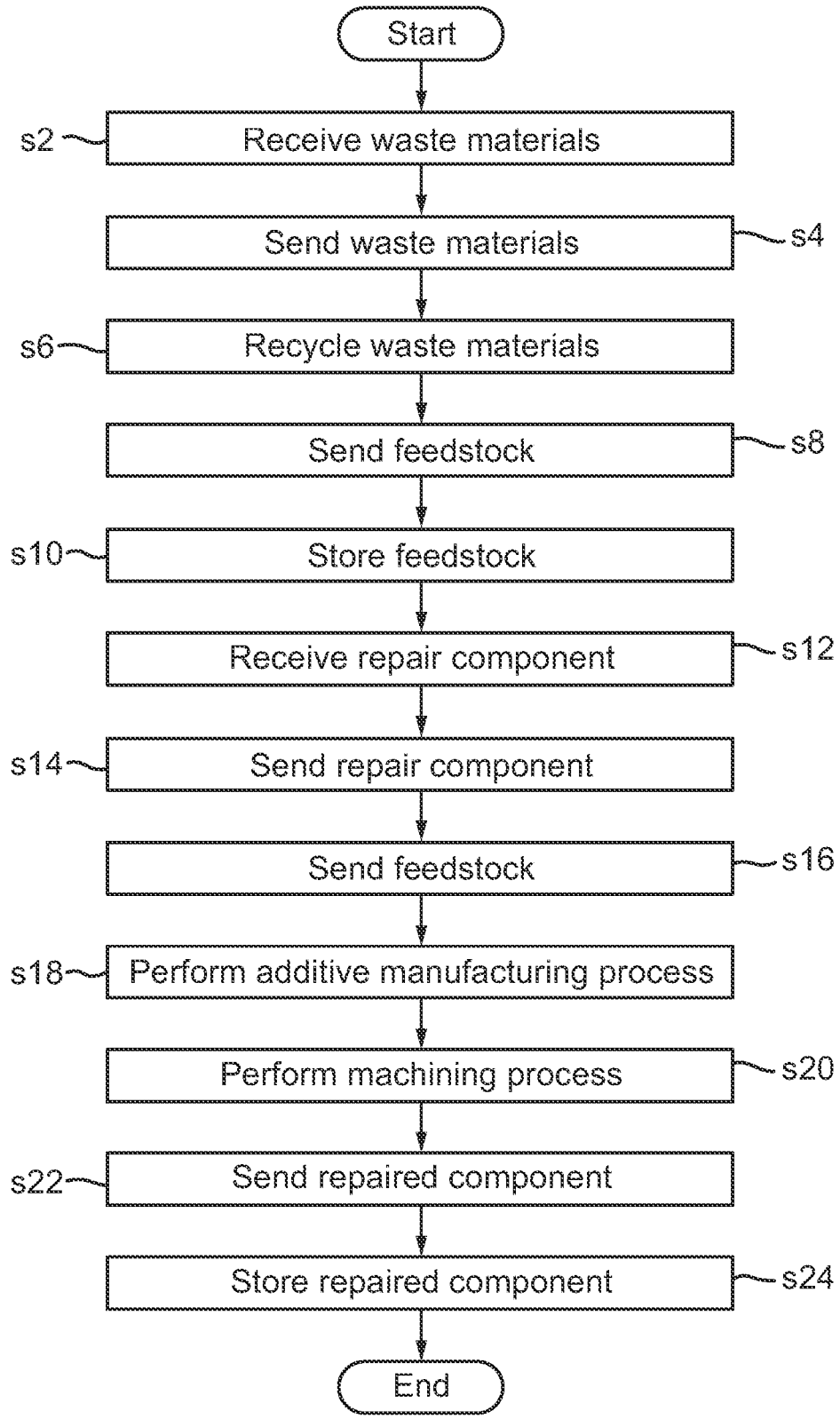

MANUFACTURING SYSTEM FOR USE IN SPACE

RELATED APPLICATIONS

This application is a national phase application filed under 35 USC § 371 of PCT Application No. PCT/GB2019/050433 with an International filing date of Feb. 19, 2019 which claims priority of GB Patent Application 1802704.5 filed Feb. 20, 2018 and EP Patent Application 18157631.5 filed Feb. 20, 2018. Each of these applications is herein incorporated by reference in their entirety for all purposes.

FIELD OF THE INVENTION

The present invention relates to systems and methods for manufacturing in space.

BACKGROUND

Additive Manufacturing (AM) (also known as Additive Layer Manufacture (ALM), 3D printing, etc.) is a process that may be used to produce functional, complex objects, layer by layer, without moulds or dies. Typically, such processes include providing material (e.g. metal or plastic) in the form of a powder or a wire and, using a powerful heat source such as a laser beam, electron beam, or an electric or plasma welding arc, melting an amount of that material and depositing the melted material (e.g. on a base plate of a work piece). Subsequent layers are then built up upon each preceding layer.

Example AM processes include, but are not limited to, Fused Deposition Modelling (FDM), Laser Blown Powder, Selective Laser Sintering (SLS), and Wire and Arc technologies.

In a separate field, outer space is a difficult environment to operate in. To date, the ability to manufacture in space is limited.

SUMMARY OF THE INVENTION

The present inventors have realised that it is beneficial for space-based facilities to be sufficiently self-sustaining, and that a space-based manufacturing capacity may help to achieve this self-sufficiency in space. In-space manufacturing could not only repair or replace parts of a space vehicle or space station but could also build components of larger structures. The present inventors have further realised that additive manufacturing (AM), especially wire-based AM process, may be used to provide a space-based manufacturing capacity.

In a first aspect, the present invention provides a system comprising: an additive manufacturing apparatus configured to perform an additive manufacturing process using a feedstock supplied thereto, thereby to produce an article; a feedstock storage module configured to supply feedstock to the additive manufacturing apparatus; a machining apparatus configured to perform a machining process; a controller configured to control operation of the additive manufacturing apparatus and the machining apparatus; and a recycling module configured to receive a waste material and to produce the feedstock therefrom, and to transfer the produced feedstock to the feedstock storage module. The additive manufacturing apparatus and the machining apparatus comprise a common heat source, the additive manufacturing apparatus configured to use the common heat source to perform the additive manufacturing process, and the machining apparatus configured to use the common heat source to perform the machining process.

The system may be for in-space manufacture of articles. The system may be arranged for launch delivery into space. The system may be located on a vehicle configured to be launched into space.

The additive manufacturing apparatus may comprise stabilisation means for stabilising a workpiece during the additive manufacturing process. The machining apparatus may comprise stabilisation means for stabilising an object undergoing a machining process. The stabilisation means of the additive manufacturing apparatus may be the same as the stabilisation means of the machining apparatus.

The additive manufacturing apparatus and the machining apparatus may be located in a common hermetic enclosure.

The additive manufacturing apparatus may be configured to, using the common heat source, implement the additive manufacturing process to build the article onto a build tray. The machining apparatus may be configured to, using the common heat source, cut the built article from the build tray.

The recycling module may be configured to receive at least some of the waste material from the additive manufacturing apparatus, the waste material being waste material from the additive manufacturing process. The recycling module may be configured to receive the waste material from the machining apparatus, the waste material being waste material from the machining process.

The common heat source may comprise one or more lasers.

The feedstock may comprise one or more materials selected from the group of materials consisting of: tungsten, titanium, aluminium, copper, polyetherimide, and polycarbonate.

The system may further comprise a storage module configured to store one or more articles that are to be repaired or modified by the additive manufacturing apparatus. One or both of the additive manufacturing apparatus and the machining apparatus may be configured to receive an article to be repaired from the storage module.

The system may further comprise an inspection module configured to measure a surface of the article.

The additive manufacturing apparatus may be a wire-based or filament-based additive manufacturing apparatus and the feedstock comprises a wire or a filament.

The additive manufacturing process may be a plastics-based additive manufacturing process and the feedstock may comprise a plastic. The additive manufacturing process may be a metal-based additive manufacturing process and the feedstock may comprise a metal.

In a further aspect, the present invention provides an entity comprising the system of any preceding aspect. The entity is an entity selected from the group of entities consisting of a space vehicle, a satellite, and a space station.

The entity may be configured to dock, in space, with a further entity. The recycling module may be configured to receive the waste material from the further entity when it is docked with the entity and/or the entity is configured to send the article to the further entity when it is docked with the entity. The storage module may be configured to receive the article to be repaired from the further entity when it is docked with the entity and/or the entity is configured to send the repaired article to the further entity when it is docked with the entity.

In a further aspect, the present invention provides a system for in-space manufacture of articles. The system comprises a space-based object comprising: an additive manufacturing apparatus configured to perform an additive manufacturing process using a feedstock supplied thereto, thereby to produce an article; a feedstock storage module configured to supply feedstock to the additive manufacturing apparatus; a controller configured to control operation of the additive manufacturing apparatus; and a recycling module configured to receive a waste material and to produce feedstock therefrom, and to transfer the produced feedstock to the feedstock storage module.

The recycling module may be configured to receive the waste material from the additive manufacturing apparatus. The waste material may be waste material from the additive manufacturing process.

The space-based object may further comprise a machining apparatus configured to perform a machining process. The controller may be configured to control operation of the machining apparatus. The recycling module may be configured to receive the waste material from the machining apparatus. The waste material may be waste material from the machining process. The additive manufacturing apparatus and the machining apparatus may share a common heat source.

The space-based object may be configured to dock, in space, with a further space-based object. The recycling module may be configured to receive the waste material from the further space-based object when it is docked with the space-based object. The space-based object may be configured to send the article to the further space-based object when it is docked with the space-based object.

The space-based object may further comprise a storage module configured to store one or more articles that are to be repaired or modified by the additive manufacturing apparatus. The additive manufacturing apparatus may be configured to receive an article to be repaired from the storage module, and to perform the additive manufacturing process using the received article to be repaired, thereby to produce a repaired article. The space-based object may be configured to dock, in space, with a further space-based object. The storage module may be configured to receive the article to be repaired from the further space-based object when it is docked with the space-based object. The space-based object may be configured to send the repaired article to the further space-based object when it is docked with the space-based object.

The space-based object may further comprise an inspection module configured to measure a surface of the produced article and/or the article to be repaired. These measurements may be used to create one or more digital models for use by the controller to control the additive manufacturing apparatus.

The system may further comprise an Earth-based facility and a communication network connecting the space-based object to the Earth-based facility. The Earth-based facility may be configured to send data to the space-based object. The controller may be configured to control the additive manufacturing apparatus using data received from the Earth-based facility.

The additive manufacturing apparatus may be a wire-based additive manufacturing apparatus. The feedstock may comprise a wire.

The additive manufacturing process may be a plastics-based additive manufacturing process. The feedstock may comprise a plastic.

The additive manufacturing process may be a metal-based additive manufacturing process. The feedstock may comprise a metal.

The space-based object may be a space vehicle or a space station. The space-based object may be autonomous.

In a further aspect, the present invention provides a method of manufacturing an article in space. The method comprises, in a space-based object: receiving, by a recycling module, a waste material and producing therefrom a feedstock; transferring, by the recycling module, to a feedstock storage module, the produced feedstock; supplying, by the feedstock storage module, to an additive manufacturing apparatus, the feedstock; and controlling, by a controller, the additive manufacturing apparatus to perform an additive manufacturing process using the supplied feedstock, thereby to produce the article.

BRIEF DESCRIPTION OF THE DRAWINGS

FIG. 2 is a process flow chart showing certain steps of an in-space manufacturing process implemented by the space-based object.

DETAILED DESCRIPTION

Figure 1:
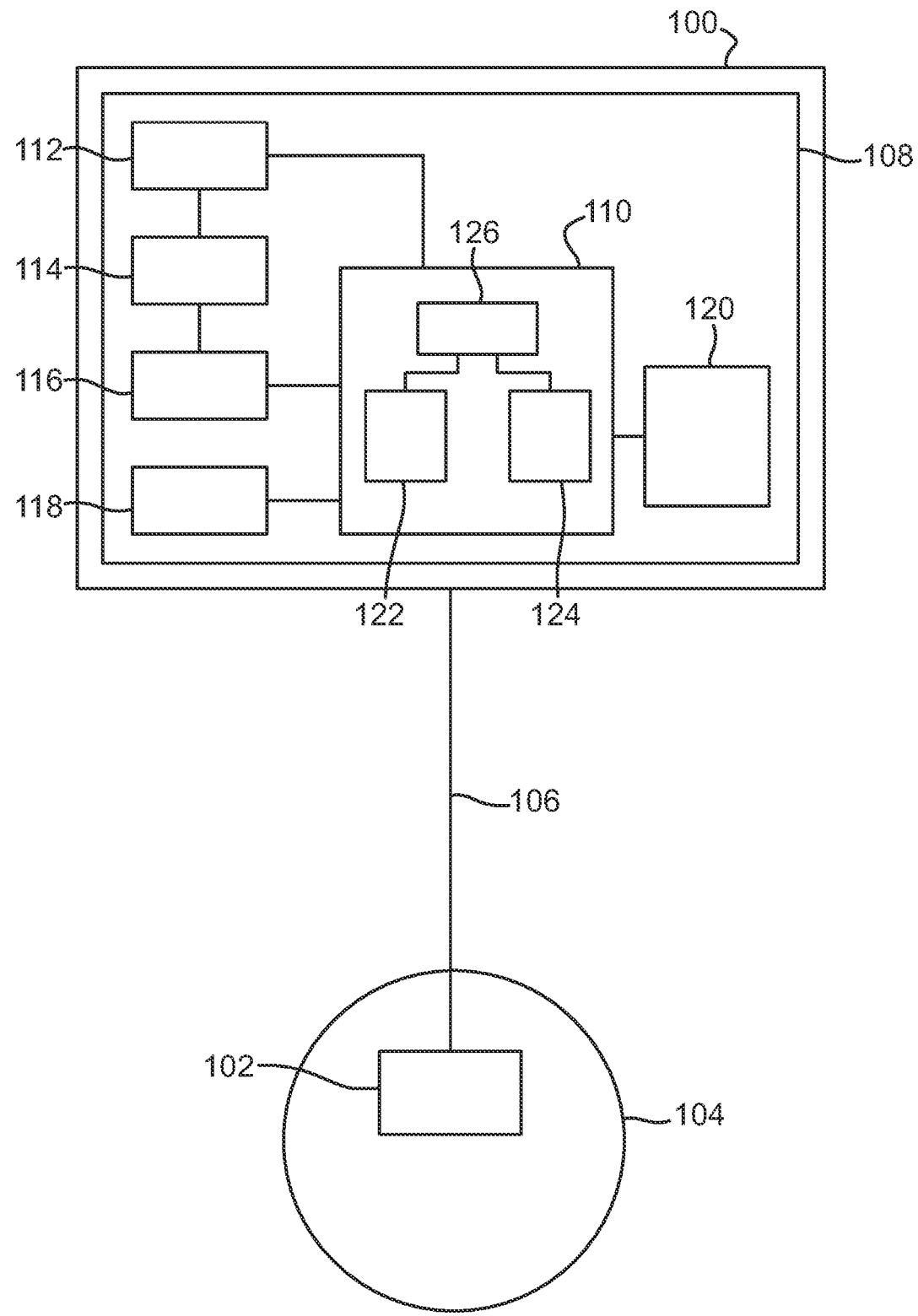
FIG. 1 is a schematic illustration (not to scale) of a space-based object.

FIG. 1 is a schematic illustration (not to scale) of an in-space facility 100. In this embodiment, the in-space facility 100 is a space-based object, i.e. an object that is located in space. Specifically, the facility 100 is in orbit in space around a celestial body having a magnetic field, which in this embodiment is the Earth 104.

The facility 100 may be, for example, a space vehicle, satellite, or space station. The facility 100 is capable of communicating with one or more Earth-bound systems 102 located on the Earth 104, via a communication link 106.

Thus, data may be sent from the facility 100 to the one or more Earth-bound systems 102 and vice versa.

The facility 100 comprises an in-space manufacturing module 108.

The in-space manufacturing module 108 is configured to perform in-space manufacturing. The term "in-space manufacturing" is used herein to refer to production of articles or component parts in outer space, for example in orbit around the Earth 104. In-space manufacturing may be used to produce either new structures or repair existing structures.

Preferably, the in-space manufacturing module 108 is autonomous and situationally aware, i.e. does not require human control to operate.

In this embodiment, the in-space manufacturing module 108 comprises a manufacturing module 110, a waste material storage module 112, a recycling module 114, a feedstock storage module 116, a repair component storage module 118, and a manufactured component storage module 120.

The in-space manufacturing module 108, and the components thereof (i.e. the modules 110-120 and connections therebetween), are designed to be extremely rugged and/or able to withstand all aspects associated with the environment in which the in-space manufacturing module 108 is intended to operate (i.e. space). In this embodiment, the in-space manufacturing module 108 is rugged so as to withstand launch into space, operation in space, and, optionally, re-entry into the Earth's atmosphere and landing on the Earth.

The manufacturing module 110 comprises an additive manufacturing (AM) module 122, a post processing module 124, and a controller 126.

The AM module 122 is configured to perform one or more AM processes. Also, the AM module 122 may comprise one or more AM apparatuses. For example, in some embodiments, the AM module 122 comprises multiple AM apparatuses, each of which is configured to perform a different AM process, or the same AM process. In other embodiments, the AM module 122 comprises only a single AM apparatus configured to perform a plurality of AM processes, or a single AM process.

The terminology "Additive Manufacturing" (AM) is used herein to refer to all additive processes that may be used to produce functional, complex objects, layer by layer, without moulds or dies e.g. by providing feedstock material (e.g. metal or plastic) typically in the form of a powder or a wire, and, using a powerful heat source such as a laser beam, electron beam or an electric, or plasma welding arc, melting an amount of that material and depositing the melted material (e.g. on a base plate/work piece), and subsequently building layers of material upon each preceding layer. The heat source of the AM module 122 may be an end effector of a robot arm.

Additive Manufacture (AM) may also be known inter alia as 3D printing, Direct Digital Manufacturing (DDM), Digital Manufacturing (DM), Additive Layer Manufacturing (ALM), Rapid Manufacturing (RM), Laser Engineering Net Shaping (LENS), Direct Metal Deposition, Direct Manufacturing, Electron Beam Melting, Laser Melting, Freeform Fabrication, Laser Cladding, Direct Metal Laser Sintering.

Preferably, the AM module 122 is configured to perform wire-based or filament-based additive manufacture, which may also be known as wire-fed or filament-fed additive manufacture. Wire-based AM includes, for example, Fused Deposition Modelling and wire arc additive manufacture (WAAM) and laser additive manufacture (LAM). WAAM is the deposition of metal, via a fusion welding process such as plasma arc welding or gas tungsten arc welding, onto a pre-existing substrate that allows a 3-dimensional part to be built. Wire-based AM is applicable to, e.g., metallic alloys such as titanium and aluminium, and polymers such as plastics.

Advantageously, the AM process may take advantage of the low gravity environment in which it is located e.g. by printing from two sides of a common centre line.

Preferably, the printing material used in the AM process, i.e. the feedstock, is suitably resistant such that the printed article is capable of being built in space conditions. In some embodiments, the printing material is such that the printed article is resistant to both low and high temperatures that may be experienced within the in-space facility 100, pressures that may be experienced within the in-space facility 100, and/or vacuum conditions. In some embodiments, the printing material does not emit particles. In some embodiments, the printing material is resistant to ultraviolet (UV) radiation. In some embodiments, the printing material is resistant to or non-reactive with oxygen (e.g. atomic oxygen). Examples of appropriate printing materials include, but are not limited to, metals (such as tungsten, titanium, aluminium, copper, and alloys thereof) and plastics (such as polyetherimide (PEI), polycarbonate (PC), polyetherketoneketone (PEKK), or a mixture of two or more thereof).

Preferably, the AM module 122 comprises a stabiliser for stabilising, holding, or retaining, etc., the article being built by the AM process. For example, in some embodiments, the AM module comprises a build tray or prefabricated component that is movable with respect to the heat source of the AM module 122, or vice versa. The article may be built onto a build surface of the build tray or prefabricated component using the AM process, i.e. the article may be fused to the build tray. The build tray may be held by, fixed to, or be an end effector of a robot arm. An article built on the build tray or prefabricated component may be subsequently cut away from the build tray or prefabricated component by the post processing module 124, e.g. using the heat source that is common to the AM module 122 and the post processing module 124, or using a different cutting tool or cutting process. After use, the build tray or prefabricated component may be reused to build a further article. After use, the build tray or prefabricated component may be recycled by the recycling module 114. In some embodiments, for example embodiments in which the article and/or the build tray or prefabricated component is magnetic, one or more magnets may be used to stabilise the article during the AM process. In some embodiments, jets of air may be used to stabilise and/or cool the article during the AM process. The post processing module 124 is configured to perform one or more post processing operations. Example post processing operations include, but are not limited to machining operations for machining an article, for example laser machining, polishing operations, deburring operations/blasting operations and laser ablation operations. Post processing operations may, for example, be implemented to create desired surface finish on an article. The post-processing module 124 may include a machining apparatus.

Preferably, the post processing module 124 uses the same heat source (e.g. one or more lasers) to machine objects as the AM module 122 uses to perform AM processes. In other words, the AM module 122 and the machining apparatus share one or more common heat sources.

Preferably, the post processing module 124 (e.g. the machining apparatus of the post processing module 124) comprises a stabiliser for stabilising, holding, or retaining, etc., the article being processed or machined. In some embodiments, the stabiliser of the post processing module 124 is the same as that of the AM module 122, i.e. the AM module 122 and the machining apparatus share one or more common stabilising means. In some embodiments, jets of air are used to stabilise and/or cool the article during machining processes. Advantageously, the jets of air tend to additionally provide for swarf extraction from the article being machined. The extracted swarf may be recovered, e.g. in a container, and recycled. In some embodiments, a vacuum is used to stabilise and/or cool the article during machining processes, e.g. to apply a suction force to the article and thereby hold the article in place. The vacuum may be provided or established using the external, space environment of the facility. For example, the article may be coupled to a line or pipe that may open (via an openable and closable valve) to space. Advantageously, this vacuum may be implemented to additionally provide for swarf extraction from the article being machined. The extracted swarf may be recovered, e.g. in a container, and recycled.

The controller 126 is configured to control operation of the AM module 122 and the post processing module 124.

In some embodiments, one or both of the AM module 122 and the post processing module 124 are located in a hermetic enclosure. For example, the AM module 122 and the post processing module 124 may be located in the same hermetic enclosure. The hermetic enclosure may be back-filled with, for example, an inert gas. Enclosure of the AM module 122 and/or the post processing module 124 may prevent or oppose unwanted movement of material (e.g. feedstock, waste material, particulate matter, swarf, etc.) around the facility 100. Enclosure of the AM module 122 and/or the post processing module 124 may facilitate recovery of material (e.g. feedstock, waste material, particulate matter, swarf, etc.) for recycling.

In some embodiments, the manufacturing module 110 includes one or more additional modules in addition to the AM module 122 and the post processing module 124. An example of an additional module is an inspection module that is configured to inspect or measure a surface of a component that is to be repaired (e.g. to generate a digital model of that component that may be used to control operations of the AM module 122 and/or the post processing module 124) and/or inspect or measure a surface of a produced component to verify that the component has been produced within a desired tolerance. An inspection module may, for example, comprise a coordinate measuring machine (CMM). A further example of an additional module is a pre-processing module that is configured to perform one or more pre-processing operations on a component, e.g. prior to commencement of an AM process. Pre-processing operations may include, but are not limited to, one or more of: cleaning operations to clean a surface of an article, machining processes for machining an article (e.g. to remove a damaged portion of an article, or conform an article to a desired shape), and/or priming processes to prime or prepare an article for a subsequent process. A pre-processing module may use the same heat source (e.g. a laser) to machine objects as the AM module 122 uses to perform AM processes and/or the post processing module 124 uses to perform machining operations. A pre-processing module may include a stabilising means, which may be same as that of the AM module 122 and/or the post processing module 124. A pre-processing module may be located in a hermetic enclosure, e.g. the same enclosure as the AM module 122 and/or the post processing module 124. A further example of an additional module is an environmental control unit configured to regulate an environment at the build area of the AM module 122 and/or at the processing area of a machining apparatus.

The waste material storage module 112 is configured to store waste materials. The stored waste materials may include waste materials of any processes performed on the facility 100. For example, the waste materials may include waste materials of the manufacturing or fabrication processes performed by the manufacturing module 110. The stored waste material may include waste material of AM and/or machining operations. The stored waste materials may include components which are, for example, defective, damaged, obsolete, or superfluous to requirements.

In this embodiment, the waste material storage module 112 stores only those materials that are useable by the manufacturing module 110. For example, the AM module 122 may be configured to perform one or more polymer-based AM processes which use one or more particular polymers, in which case the waste material storage module 110 tends to store only the one or more particular polymers used by the AM module 122. Materials that are not useable by the manufacturing module 110 tend not to be stored by the waste material storage module 110 and may, for example, be ejected from the facility 100. Ejected material may be introduced into a decaying Earth orbit to be destroyed.

The waste material storage module 112 is coupled to the recycling module 114 such that the material stored in the waste material storage module 112 may be sent to the recycling module 114.

The recycling module 114 is configured to recycle material received from the waste material storage module 112, thereby to produce new feedstock for use by the manufacturing module 110. The recycling module 114 is coupled to the feedstock storage module 116 such that feedstock produced by the recycling module 114 may be sent to the feedstock storage module 116.

In this embodiment, the recycling module 114 is configured to produce feedstock in a form that is useable by the manufacturing module 110. For example, the AM module 122 may be configured to perform one or more wire-based AM processes, in which case the recycling module 114 is configured to produce a wire or filament feedstock for the AM module 122. For example, the recycling module 114 may include a first module to fragment or reduce the size of the waste material to a more manageable size, a second module configured to heat (e.g. melt) the fragmented waste material, a third module to cast or extrude the heated waste material so as to form the wire feedstock. Similarly, if the AM module 122 is configured to perform one or more powder-based AM processes, the recycling module 114 may be configured to produce a powder feedstock.

The feedstock storage module 116 is configured to store the feedstock produced by the recycling module 114. In embodiments in which the feedstock is a wire or filament, the feedstock storage module 116 may, for example, comprise a spool or reel onto which the wire feedstock may be wound.

The feedstock storage module 116 is coupled to the manufacturing module 110 such that the feedstock may be fed to the AM module 122 for use in the AM processes. Supply of the feedstock to the AM module 122 by the feedstock storage module 116 may be controlled by the manufacturing module 110, e.g. by the controller 126.

The repair component storage module 118 is configured to store components or articles that are to be repaired or modified by the manufacturing module 110. More specifically, the repair component storage module 118 stores objects that are to undergo AM processes by the AM module 122 and/or machining processes by the post processing module 124.

The repair component storage module 118 is coupled to the manufacturing module 110 such that the objects stored therein may be sent to the manufacturing module 110 for processing. Supply of the stored objects by the repair component storage module 118 may be controlled by the manufacturing module 110, e.g. by the controller 126.

The manufactured component storage module 120 is configured to store components or articles that have been processed by the manufacturing module 110, i.e. objects that have undergone AM processes and/or machining. Transfer of the processed objects from the manufacturing module 110 to the manufactured component storage module 120 may be controlled by the manufacturing module 110, e.g. by the controller 126. The manufactured component storage module 120 may be configured to send processed objects to locations where they will be utilised.

Apparatus, including the controller 126, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

FIG. 2 is a process flow chart showing certain steps of an in-space manufacturing process implemented by the facility 100.

It should be noted that certain of the process steps depicted in the flowchart of FIG. 2 and described below may be omitted or such process steps may be performed in differing order to that presented below and shown in FIG. 2. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the waste material storage module 112 receives waste materials. The waste material may be received from any appropriate source. Examples of waste materials and sources thereof include but are not limited to: unused or excess feedstock from the AM module 122; material removed from an object by the post processing module 124; defective, damaged, obsolete, or superfluous components or objects from modules/systems on the facility 100 remote from the in-space manufacturing module 108; and defective, damaged, obsolete, or superfluous components or objects from modules/systems remote from the facility 100 (for example, objects that are received by the facility 100 from a different space-based object e.g. a space-based object that has docked with the facility 100).

At step s4, the waste material storage module 112 sends the waste materials to the recycling module 114.

At step s6, the recycling module 114 processes the waste material to produce feedstock for use by the AM module 122.

At step s8, the recycling module 114 sends the feedstock to the feedstock storage module 116.

At step s10, the feedstock storage module 116 stores the received feedstock.

At step s12, the repair component storage module 118 receives a component that is to be repaired or modified by the manufacturing module 110. Such components may be received from any appropriate source including but are not limited to from modules/systems on the facility 100 remote from the in-space manufacturing module 108, and from modules/systems remote from the facility 100 (for example, from a different space-based object that may be docked with the facility 100).

At step s14, the repair component storage module 118 sends the component that is to be repaired to the manufacturing module 110.

At step s16, the feedstock storage module 116 sends feedstock to the manufacturing module 110.

At step s18, the AM module 122 of the manufacturing module 110 performs one or more AM processes (e.g. a wire-based AM process) on the received component using the received feedstock. The AM process may be performed to repair the component. For example, damaged areas of the component may be repaired by the AM module 122 using laser sintering.

The AM module 122 may be controlled by the controller 126 using a digital model of the component that is to be produced. This digital model may be prestored by the controller 126, or may be received by the controller 126 prior to the one or more AM processes being performed. This digital model may be received by the controller 126 from, for example, the entity from which the component was received by the repair component storage module 118, or from the Earth-bound systems 102 via the communication link 106.

For example, the facility 100 may receive, from a docked entity, a component to be repaired and also data specifying, e.g. the repair action(s) that are to be performed and/or digital models of the component to be repaired and the finished component.

The controller 126 may control the AM apparatus 122 using a digital model of the component that is to be repaired (i.e. the component received from the repair component storage module 118). This digital model may be generated by the manufacturing module 110 measuring a surface of the received component.

At step s20, the post processing module 124 of the manufacturing module 110 performs one or more machining processes on the received component. For example, certain portions of the component can be removed by the post processing module 124 to give the component a desired shape.

In some embodiments, machining operations may be performed after the one or more AM processes, for example to remove excess material added during the AM processes and/or to include additional features (such as holes, grooves, etc.) in the component.

In some embodiments, machining operations may be performed before the one or more AM processes, for example to remove damaged portions of the component that are then rebuilt using AM processes.

The post processing module 124 may be controlled by the controller 126 using a digital model of the component that is to be produced. This digital model may be prestored by the controller 126, or may be received by the controller 126 prior to the machining processes being performed. This digital model may be received by the controller 126 from, for example, the entity from which the component was received by the repair component storage module 118, or from the Earth-bound systems 102 via the communication link 106.

The controller 126 may control the post processing module 124 using a digital model of the component that is to be repaired (i.e. the component received from the repair component storage module 118). This digital model may be generated by the manufacturing module 110 measuring a surface of the received component.

Thus, the manufacturing module 110 repairs or modifies the component received from the repair component storage module 118. In some embodiments, the produced component is inspected to ensure that it is within desired tolerances.

At step s22, the manufacturing module 110 sends the repaired or modified component to the manufactured component storage module 120.

At step s24, the manufactured component storage module 120 stores the repaired or modified component. The manufactured component storage module 120 may deliver the repaired or modified component to the location at which that component is to be used, for example to a location on the facility 100 that is remote from the in-space manufacturing module 108, or to a different space-based object that is docked with the facility 100.

Thus, an in-space manufacturing process is provided.

The above described method and apparatus advantageously tend to enable the in-space (e.g. in-orbit) manufacture of parts and tools, for use in space. Also, the above described in-space manufacturing process tends to facilitate space-based construction of large structures, e.g. space vehicles, space stations, communication arrays, power generation arrays, etc. The above described in-space manufacturing tends not to be constrained by the design and manufacturing confines of gravity, current manufacturing processes, and launch-related structural stresses.

Advantageously, the manufacture of items in space tends to lower launch costs (e.g. payload volume tends to be reduced by storing feedstock materials in a compressed form for launch), facilitate the exploration of space, and improve mission sustainability for example by extending the useful life of assets launched into space.

The above described method and apparatus advantageously may be reconfigurable and autonomous. The automatic fabrication, service, and repair of components tends to be provided.

The above described method and apparatus advantageously tend to be robust to the low gravity environments, radiation, and the extremes in temperature that may be experienced in space.

Advantageously, the above described method and apparatus tend to be capable of fabricating, servicing and/or repairing a wide range of objects. Such objects may include, but are not limited to, space craft fuel tanks, aeroshell composite parts (CFRP), plastic and/or metallic 3D printed components such as propulsion parts, injectors, nozzles, thrusters, and electrical components such as those used on satellites.

In some embodiments, the waste material storage module and the recycling module are omitted.

In some embodiments, the post processing module is omitted.

In the above embodiments, the manufacturing module is implemented on an in-space facility. However, in other embodiments, the manufacturing module is implemented on a different entity. For example, the manufacturing module may be located or comprised in a system arranged for launch delivery into space, such as a space vehicle (i.e. a spacecraft or spaceship), a satellite, or at least part of a space station. The space vehicle may be located on the Earth, for example with the intention of launching into space.

What is claimed is:

1. A system comprising:
   an additive manufacturing apparatus configured to perform an additive manufacturing process using a feedstock supplied thereto, thereby to produce an article;
   a feedstock storage module configured to supply feedstock to the additive manufacturing apparatus;
   a machining apparatus configured to perform a machining process;
   a controller configured to control operation of the additive manufacturing apparatus and the machining apparatus; and
   a recycling module configured to receive a waste material and to produce the feedstock therefrom, and to transfer the produced feedstock to the feedstock storage module; wherein
   the additive manufacturing apparatus and the machining apparatus comprise a common heat source, the additive manufacturing apparatus is configured to use the common heat source to perform the additive manufacturing process, and the machining apparatus is configured to use the common heat source to perform the machining process.

2. The system of claim 1, wherein the system is for in-space manufacture of articles.

3. The system of claim 1, wherein the system is arranged for launch delivery into space.

4. The system of claim 1, wherein the additive manufacturing apparatus comprises stabilisation means for stabilising a workpiece during the additive manufacturing process.

5. The system of claim 1, wherein the machining apparatus comprises stabilisation means for stabilising an object undergoing a machining process.

6. The system of claim 5, wherein the additive manufacturing apparatus comprises stabilisation means for stabilising a workpiece during the additive manufacturing process; and
   wherein the stabilisation means of the additive manufacturing apparatus is the same as the stabilisation means of the machining apparatus.

7. The system of claim 1, wherein the additive manufacturing apparatus and the machining apparatus are located in a common hermetic enclosure.

8. The system of claim 1, wherein the additive manufacturing apparatus is configured to, using the common heat source, implement the additive manufacturing process to build the article onto a build tray, and the machining apparatus is configured to, using the common heat source, cut the built article from the build tray.

9. The system of claim 1, wherein the recycling module is configured to receive at least some of the waste material from the additive manufacturing apparatus, the waste material being waste material from the additive manufacturing process.

10. The system of claim 1, wherein the recycling module is configured to receive the waste material from the machining apparatus, the waste material being waste material from the machining process.

11. The system of claim 1, wherein the common heat source comprises one or more lasers.

12. The system of claim 1, wherein the feedstock comprises one or more materials selected from the group of materials consisting of: tungsten, titanium, aluminium, copper, polyetherimide, and polycarbonate.

13. The system of claim 1, wherein
   the system further comprises a storage module configured to store one or more articles that are to be repaired or modified by the additive manufacturing apparatus;
   one or both of the additive manufacturing apparatus and the machining apparatus is configured to receive an article to be repaired from the storage module.

14. The system of claim 1, wherein the system further comprises an inspection module configured to measure a surface of the article.

15. The system of claim 1, wherein the additive manufacturing apparatus is a wire-based or filament-based additive manufacturing apparatus and the feedstock comprises a wire or a filament.

16. The system of claim 1, wherein either:
   the additive manufacturing process is a plastics-based additive manufacturing process and the feedstock comprises a plastic; or
   the additive manufacturing process is a metal-based additive manufacturing process and the feedstock comprises a metal.

17. The system of claim 1, wherein the system is located on a vehicle configured to be launched into space.

18. An entity comprising the system of claim 1, the entity being an entity selected from the group of entities consisting of a space vehicle, a satellite, and a space station.

19. The entity of claim 18, wherein
   the entity is configured to dock, in space, with a further entity; and
   the recycling module is configured to receive the waste material from the further entity when it is docked with the entity and/or the entity is configured to send the article to the further entity when it is docked with the entity.

20. The entity of claim 18, wherein the entity is configured to dock, in space, with a further entity; and the storage module is configured to receive the article to be repaired from the further entity when it is docked with the entity and/or the entity is configured to send the repaired article to the further entity when it is docked with the entity.

\* \* \* \* \*